United States Patent Office 3,451,245
Patented June 24, 1969

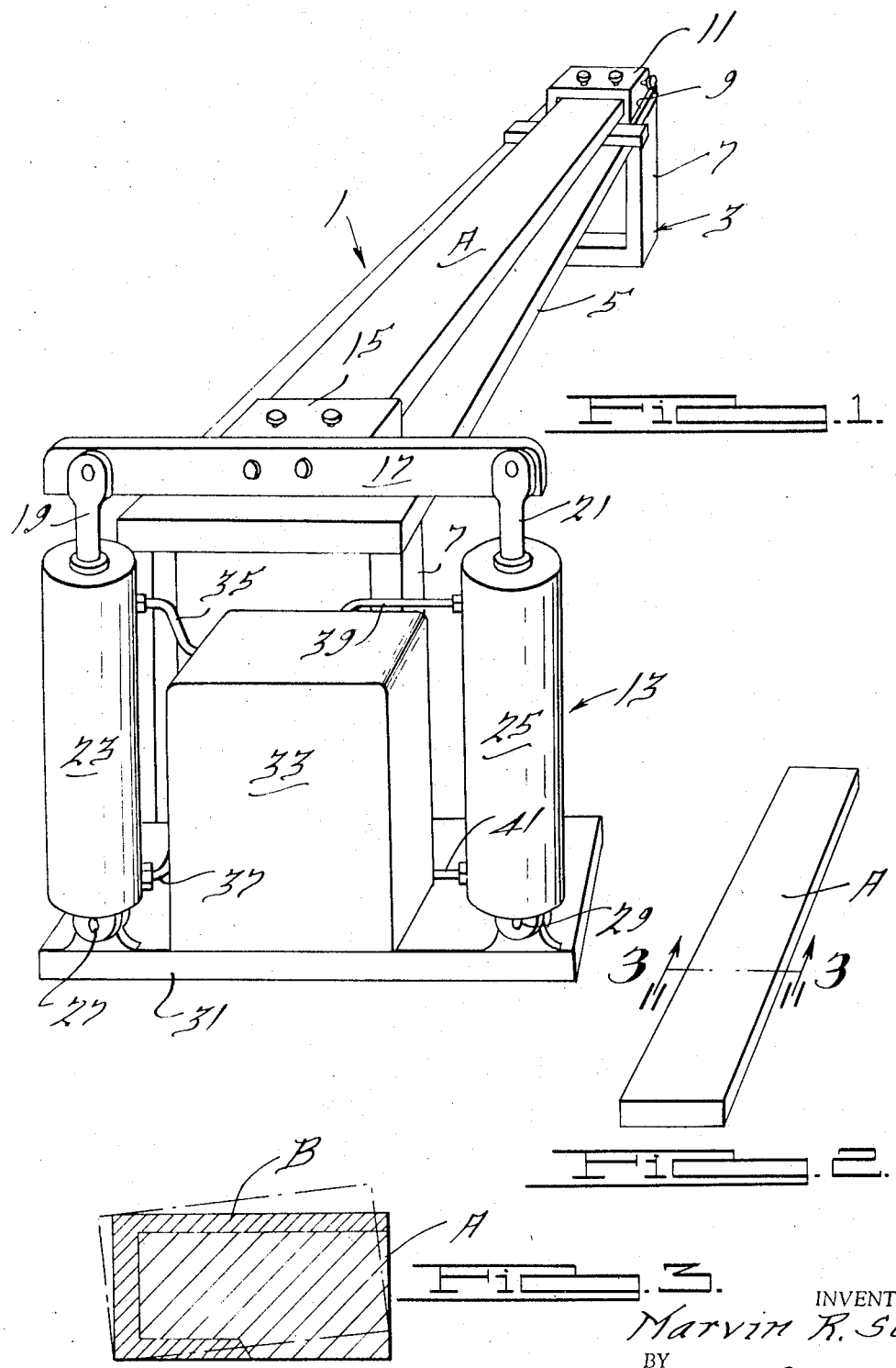

3,451,245
TORSION STRAIGHTENER
Marvin R. Scott, Detroit, Mich., assignor to
Detroit Flame Hardening Company
Filed Oct. 7, 1966, Ser. No. 585,038
Int. Cl. B21d *11/14*
U.S. Cl. 72—299  1 Claim

ABSTRACT OF THE DISCLOSURE

The disclosure straightens angularly twisted parts by applying a couple of equally and oppositely acting forces to one end of the part.

---

My invention relates to a method and apparatus for straightening relatively long, twisted parts.

During the course of processing relatively long ferrous or non-ferrous parts from the raw to the finished state internal stresses are often created that twist the part so that one end is out of angular alignment with the other. Such stresses are usually created during heat treating, and most long parts leave the heat treat in an angular distorted condition and must be straightened if angular alignment is desired.

In the past, it has been customary to untwist such parts by the application of a single force to a selected portion of the part. This method has produced unsatisfactory straightening and has often resulted in costly fractures of the parts being straightened.

It is the purpose of the present invention to provide a method and apparatus that will improve the effectiveness of torsion straightening and reduce materially the danger of fracture.

The invention accomplishes the foregoing and other objects by utilizing a force couple to apply the torque for untwisting the part. Since the couple consists of equal and oppositely acting forces, it is not necessary to have a reaction surface as in the case of a single force. Consequently, a better stress distribution throughout the part is obtained and the possibility of fracture reduced to a minimum.

The invention is illustrated in the accompanying drawings in which:

FIGURE 1 is a schematic, perspective view taken from one end of a straightening apparatus embodying the invention;

FIGURE 2 is a perspective view of a typical part that may be straightened by means of the invention; and FIGURE 3 is a cross section along the line 3—3 of FIGURE 2.

The torsion straightener 1 has a frame or base 3 that includes a table 5 supported at opposite ends by legs 7. At one end of the table 5 is supported a movable or adjustable tailstock 9 carrying a clamping chuck 11 to receive and hold in fixed angular position (non-rotative) one end of a part A to be untwisted.

At the other end of the table 5 is located a couple applying unit 13 that includes a clamping chuck 15 to receive and hold the other end of the part A. The chuck 15 is affixed to a cross arm 17 which is pivoted to and supported on the ends of piston rods 19 and 21 which project from the hydraulic power cylinders 23 and 25. The cylinders 23 and 25 are pivoted at 27 and 29 to suitable brackets forming a part of hydraulic drive unit base plate 31. The hydraulic drive unit 33 includes a suitable source of oil, a pump and motor, and valving and controls to control pressure and oil flow through hydraulic lines 35 and 37 leading to the top and bottom of cylinder 23 and lines 39 and 41 leading to the top and bottom of cylinder 25.

The workpiece or part A to be straightened is shown as an elongated, rectangular steel bar having a flame-hardened case B that extends around two and one half faces of the part. During heat treatment to produce the case B, the part can be expected to distort angularly as indicated by the phantom lines in FIGURE 3. The unit 1 may be used to straighten it by supporting the ends of the part A in the chucks 11 and 15, non-alignment of the ends of the part being accommodated by tilting the chuck 15 through manual or power actuated movement of the piston rods 19 and 21 relative to each other. After the part is held in place in the chucks, the machine is actuated to apply an untwisting couple to one end of the part and suitable measuring devices may be employed to indicate when the desired degree of untwist has been achieved.

Modifications may be made without departing from the spirit and scope of the invention.

I claim:
1. An apparatus for straightening angularly distorted parts comprising a frame means for supporting an elongated part, chuck means for applying a couple of equal and oppositely acting forces to a part supported on the frame, said frame means including a socket for receiving and supporting one end of the part in a fixed angular position, said chuck means being separated from the socket adapted to hold the other end of the part and apply said couple thereto, force applying means for rotating the chuck means to untwist the part, said force applying means comprising a hydraulic cylinder means secured to said chuck means and applying a force couple to said chuck means for rotating it relative to the frame means to twist a part supported in said socket.

References Cited

UNITED STATES PATENTS

| 2,082,580 | 1/1937 | Johnson | 72—299 |
| 2,124,760 | 7/1938 | Burrington | 72—299 |
| 2,636,583 | 4/1953 | Algatt | 72—299 |

RONALD D. GREFE, *Primary Examiner.*